(12) United States Patent
Ramsel et al.

(10) Patent No.: US 11,084,605 B2
(45) Date of Patent: Aug. 10, 2021

(54) DEVICE AND SYSTEM FOR CONTROLLING MISSILES AND KILL VEHICLES OPERATED WITH GEL-LIKE FUELS

(71) Applicant: Bayern-Chemie Gesellschaft für flugchemische Antriebe mbH, Aschau am Inn (DE)

(72) Inventors: Jürgen Ramsel, Kraiburg (DE); Pedro Caldas-Pinto, Munich (DE); Karl Wieland Naumann, Mühldorf (DE); Helmut Niedermaier, Neuötting (DE); Tobias Meyer, Rednitzhembach (DE); Albert Thumann, Neumarkt (DE); Susanne Risse, Ebersberg (DE)

(73) Assignee: BAYERN-CHEMIE GESELLSCHAFT FÜR FLUGCHEMISCHE ANTRIEBE MBH, Aschau am Inn (DE)

( * ) Notice: Subject to any disclaimer, the term of this patent is extended or adjusted under 35 U.S.C. 154(b) by 124 days.

(21) Appl. No.: 15/423,909

(22) Filed: Feb. 3, 2017

(65) Prior Publication Data
US 2018/0050825 A1 Feb. 22, 2018

(30) Foreign Application Priority Data
Feb. 5, 2016 (DE) .................... 10 2016 102 104.0

(51) Int. Cl.
*B64G 1/26* (2006.01)
*F02K 9/88* (2006.01)
*B64G 1/40* (2006.01)
*F42B 10/66* (2006.01)
*F02K 9/94* (2006.01)
(Continued)

(52) U.S. Cl.
CPC .............. *B64G 1/26* (2013.01); *B64G 1/401* (2013.01); *B64G 1/402* (2013.01); *F02K 9/52* (2013.01); *F02K 9/68* (2013.01); *F02K 9/72* (2013.01); *F02K 9/80* (2013.01); *F02K 9/88* (2013.01);
(Continued)

(58) Field of Classification Search
CPC ..... F02K 9/48; F02K 9/60; F02K 9/62; F02K 9/70; F02K 9/86; F02K 9/425; F02K 9/977; F02K 1/008; F02K 9/978; F02K 9/56; F02K 9/82; C06B 23/001; C06B 31/32; C06B 31/40; C06D 5/00; F42B 15/01; G05D 1/107; F01N 13/082
See application file for complete search history.

(56) References Cited

U.S. PATENT DOCUMENTS 2,552,497 A * 5/1951 Roach ....................... F02K 9/86
 60/242
3,064,903 A * 11/1962 Butler ....................... F02K 9/52
 137/637.1
(Continued)

FOREIGN PATENT DOCUMENTS

DE 3941389 A1 6/1991
EP 1022454 A2 * 7/2000 ............... F02K 9/48
WO WO 2008/048702 A2 4/2008

*Primary Examiner* — Bernarr E Gregory
(74) *Attorney, Agent, or Firm* — Mark L. Maki; Miller Canfield

(57) ABSTRACT

Apparatus for trajectory control and/or position control of a missile (99), comprising a controllable gas generator (109, 200) with a fuel flow control valve (124, 213), an injector head (112, 202), a combustion chamber (111) and at least one outflow nozzle (103, 204) or at least one throttle.

24 Claims, 5 Drawing Sheets

Figure 1:
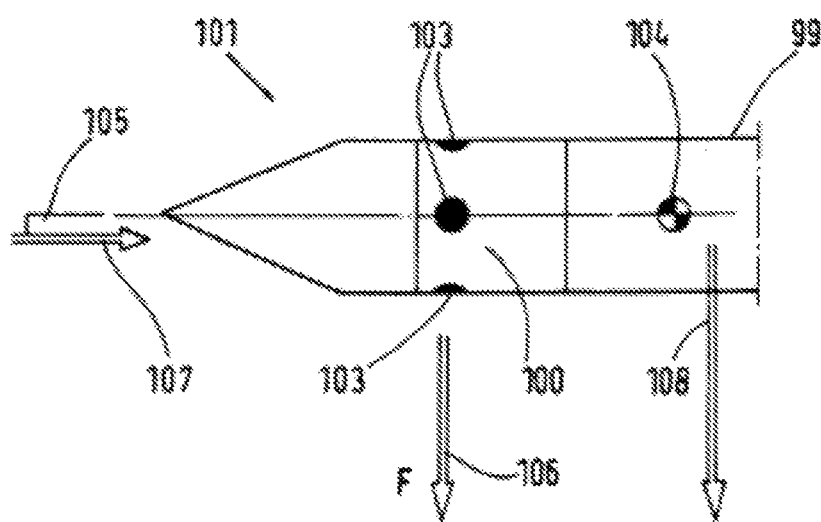

(51) Int. Cl.
*F02K 9/52* (2006.01)
*F02K 9/68* (2006.01)
*F02K 9/72* (2006.01)
*F02K 9/80* (2006.01)
*F41H 11/00* (2006.01)
*F41H 11/02* (2006.01)
*B64G 1/00* (2006.01)
*F42B 10/00* (2006.01)

(52) U.S. Cl.
CPC .............. *F02K 9/94* (2013.01); *F41H 11/02* (2013.01); *F42B 10/663* (2013.01)

(56) References Cited

U.S. PATENT DOCUMENTS

| | | | | |
|---|---|---|---|---|
| 3,115,009 A * | 12/1963 | Lattanzio | ............... | F02K 9/52 239/549 |
| 3,137,130 A * | 6/1964 | Tinkelenberg | ............ | F02K 9/52 60/258 |
| 3,192,714 A * | 7/1965 | Hickerson | ............... | F02K 9/86 60/230 |
| 3,230,704 A * | 1/1966 | Lovingham | ............... | F02K 9/64 60/225 |
| 3,242,670 A * | 3/1966 | Buswell | ............... | F02K 9/52 60/258 |
| 3,244,199 A * | 4/1966 | Hayes | ............... | F02K 9/86 138/45 |
| 3,286,469 A * | 11/1966 | Atherton | ............... | F02K 9/64 60/224 |
| 3,308,619 A * | 3/1967 | Richardson | ............... | F02K 9/50 137/601.14 |
| 3,527,056 A * | 9/1970 | Hoffman | ............... | F02K 9/52 239/410 |
| 3,698,642 A * | 10/1972 | McCullough | ............ | F02K 9/82 239/265.23 |
| 3,722,219 A * | 3/1973 | Spencer | ............... | F02K 9/52 60/258 |
| 3,726,088 A * | 4/1973 | Kretschmer | ............... | F02K 9/52 60/741 |
| 3,732,693 A * | 5/1973 | Chu | ............... | F02K 9/68 60/207 |
| 3,768,256 A * | 10/1973 | Butter | ............... | F02K 9/64 60/260 |
| 3,807,657 A * | 4/1974 | Brill | ............... | B64G 1/406 244/1 R |
| 3,814,324 A * | 6/1974 | Wanger | ............... | F02K 1/12 239/265.31 |
| 3,848,806 A * | 11/1974 | Samuelsen | ............... | F02K 9/58 239/265.11 |
| 3,908,933 A * | 9/1975 | Goss | ............... | F02K 9/95 244/3.21 |
| 3,986,687 A * | 10/1976 | Beavers | ............... | B64D 33/04 244/12.5 |
| 4,090,359 A * | 5/1978 | Doellner | ............... | B64D 41/00 60/722 |
| 4,109,460 A * | 8/1978 | Schmidt | ............... | F02K 9/64 239/127.1 |
| 4,416,621 A * | 11/1983 | Huther | ............... | F23R 3/007 110/336 |
| 4,618,931 A * | 10/1986 | Miller | ............... | F02K 9/56 60/243 |
| 4,836,451 A * | 6/1989 | Herrick | ............... | F02K 1/008 239/265.27 |
| 5,098,041 A | 3/1992 | Uetrecht | | |
| 5,133,183 A * | 7/1992 | Asaoka | ............... | F02K 9/72 60/204 |
| 5,394,690 A * | 3/1995 | Arszman | ............... | F02K 9/86 60/233 |
| 5,491,973 A * | 2/1996 | Knapp | ............... | F02K 9/86 60/242 |
| 5,651,252 A * | 7/1997 | Ansart | ............... | F23R 3/32 239/427 |
| 6,151,887 A * | 11/2000 | Haidn | ............... | F02K 9/64 60/257 |
| 6,442,931 B1 * | 9/2002 | Vasin | ............... | F02K 9/64 60/257 |
| 7,762,078 B2 * | 7/2010 | Lynch | ............... | F02K 9/978 60/771 |
| 8,113,468 B2 | 2/2012 | Patel et al. | | |
| 8,242,422 B2 | 8/2012 | Olden et al. | | |
| 8,365,531 B2 * | 2/2013 | Pidcock | ............... | F23D 11/107 60/737 |
| 8,769,925 B2 * | 7/2014 | Winter | ............... | F02K 1/1207 60/226.1 |
| 9,206,729 B2 * | 12/2015 | Mungas | ............... | F01N 13/082 |
| 2007/0062176 A1 * | 3/2007 | Bendel | ............... | F02K 9/52 60/204 |
| 2008/0083841 A1 * | 4/2008 | Bainville | ............... | F23R 3/30 239/419.3 |
| 2009/0007540 A1 * | 1/2009 | Hansen | ............... | F02K 9/26 60/39.76 |
| 2009/0211228 A1 * | 8/2009 | Mittendorf | ............... | F02K 9/58 60/258 |
| 2013/0032639 A1 * | 2/2013 | Harding | ............... | F23R 3/28 239/8 |
| 2015/0219335 A1 * | 8/2015 | Crothers | ............... | F23R 3/34 60/776 |

* cited by examiner

DEVICE AND SYSTEM FOR CONTROLLING MISSILES AND KILL VEHICLES OPERATED WITH GEL-LIKE FUELS

Continuing proliferation of weapons of mass destruction and its ballistically and aerodynamically flying carrier means requires an increasing air defense and missile defense. Therefore the armed forces must be provided with resources effectively protecting against such threats.

PRIOR ART

Ground-based and airborne anti-aircraft missile systems for the defense of aircrafts, cruise missiles, tactical ballistic missiles or other flying objects will therefore be of growing importance.

Thus, for example, the guided missile called PAC-3 has been designed for combating more advanced ballistic missiles, but is also used for conventional air targets. The guided missile PAC-3 is intended to destroy hostile rockets by a direct hit ("hit-to-kill") primarily, as hereby a positive destruction of the warhead can be ensured. As well in case of short distance flyby events the guided missile PAC-3 can also ensure a destruction of the target ("kill") by means of a fragmentary warhead with proximity igniter. Here, it is a comparatively small warhead also designated as "lethality enhancer". This shall especially ensure the effect of a direct hit, e.g. for big targets (aircraft wing) or highly structured targets (e.g. arrangement of a container with chemical or biological agents). During a flyby the effect remains small. To guarantee the necessary precision for a direct interception manoeuvre, an active pulse Doppler radar seeker and lateral or rather transverse thrust nozzles have been integrated into the airframe.

For missiles of this type the so-called Attitude Control System (ACS), which also found its way into the German language, plays an important role. This is a designation usual in space technology for the position control system of a spacecraft. Such a system typically consists of sensors, e.g. sun sensors or star sensors, the position control computer as well as actuators, e.g. reaction wheels or engines. GPS receivers or on-board navigation systems can also be added.

Trajectory control systems are described with the term Divert Control System (DCS), which also found its way into the German language.

Accordingly, trajectory and position control systems are called Divert and Attitude Control System (DACS).

ACS systems or rather rocket propulsions are for example described in the patent specifications U.S. Pat. Nos. 5,098,041 A, 8,242,422 B2, 8,113,468 B2 or WO 2008/048702 A2.

For guided missile systems, such as the PAC-3, several small fuel cartridges are distributed on the circumference of the missile with the capability of being ignited individually and with a rolling missile as prerequisite. A rolling missile is required in order that the still ignitable cartridges are in the correct angle window temporarily. This leads to specific demands and requirements to the control and the involved vibrations of the missile airframe as well as to restrictions on the selection of the seeking device ("seeker"). Rolling missiles cause a rotation of the image of the landscape of the target region or the target on the detector of a seeker head. A method for an autonomous guidance of a missile rotating about its longitudinal or rolling axis is for example described in DE 39 41 389 A1.

In prior art so-called Terminal High Altitude Area Defense (THAAD) weapon systems are also known which represent a so-called endo-atmospheric kill vehicle (kinetic warhead) with liquid fuel in combination with Divert and Attitude Control Systems (DACS). These weapon systems in particular aim at ballistic short and medium range missiles and shall serve for destroying these missiles in a significant distance of the target object and at high altitude. The continuously working DACS system used hereby provides a faster propulsion which can control the THAAD missile and its kill vehicle such that it can intercept the attacking object. Here, the DACS system provides two types of propulsion, namely one for the so-called Attitude Control and the other for the trajectory control of the acting stage (kill vehicle).

The so-called Standard Missile 3 (SM-3) ship-based carrier systems which use exo-atmospheric warheads (kill vehicle) with continuously working DACS system and solid fuel are also known.

The missiles especially intended for higher interception layers are often constructed with two or more stages and routinely comprise a propulsion stage and an acting stage, also called kill vehicle. After separating the propulsion stage the kill vehicle with transverse thrust nozzles (DACS=Divert and Attitude Control System) is guided into the targeted object. A DACS system with transverse thrust nozzles often consists of four nozzles in the centre of gravity of the missile which provide the required transverse or rather lateral acceleration. Additionally, at least four nozzles at the rear or also at the head of the kill vehicle controlling the position of the kill vehicle are regularly arranged. Consequently, Divert and Attitude Control Systems are used to guide a missile to a target during a final approach (endgame).

For the Surface to Air Missile, called Aster, four nozzles in the wing tips are used continuously acting in direction of the centre of gravity and with a solid fuel propellant. Here, the stabilization occurs aerodynamically.

ACS or rather DACS systems are used in state of the art to support the aerodynamic control of missiles, in particular when the aerodynamic effect of the control surfaces is reduced. This can occur for example at high altitudes or low velocities.

ACS or rather DACS systems are also used when no aerodynamic control surfaces are provided, e.g. during an exo-atmospheric flight or rather when the agility of the missile is too small, for a direct hit, e.g. at the endgame.

Especially during a so-called endgame fast trajectory changes have to be executed for which substantial transverse thrust forces are required. Hereby we discriminate two types:

Firstly the thrust input by the missile's centre of gravity can be used for a direct trajectory change. On the other hand, the thrust input out of the centre of gravity can be used to change the missile position for supporting the aerodynamic forces.

According to prior art in the above-mentioned systems both discretely and continuously working systems are applied.

As represented, a rolling missile is partly assumed so that the still ignitable cartridges pass through the correct angle window. This has corresponding effects on the design of the cartridges regarding momentum and combustion period as well as the steering or rather guidance logic of the missile. Furthermore this leads to specific requirements to the control with regard to the vibrational behaviour of the missile airframe as well as to constraints for the seeker selection.

The systems developed so far in prior art are tailored to specific missiles and gas generators or rather associated with these and not applicable in arbitrary systems. Partly solid fuel gas generators such as in the Aster system are required.

Other systems operate with liquid fuel gas generators, for example in the THAAD endo-exo-atmospheric kill vehicle system with DACS.

The known systems are partially provided with many small solid impulse engines several of which are usually ignited together or one after the other at appropriate azimuthal orientation to generate an impulse transverse to the missile axis, e.g. for the mentioned Attitude Control System (ACS) PAC 3.

Other arrangements are equipped with a solid gas generator and a valve set continuously distributing the gas to thrust nozzles corresponding to the thrust requirements and therefore generating a resulting impulse, equipped e.g. for Divert Control Systems (DCS): Aster; for Divert and Attitude Control Systems (DACS): Standard Missiles SM-3.

Still another arrangements comprise gas generators operated with a liquid fuel (hydrazine or MMH), which generate gas for transverse thrust nozzles with valves, for example as DCS in THAAD.

Furthermore propulsions with one- or two-component engines (hydrazine, dinitrogen tetroxide, nitrogen oxide mixtures, nitric acid) known from the satellite control technology are used.

DISADVANTAGES OF PRIOR ART AND OBJECTS OF THE INVENTION

This prior art has numerous severe disadvantages.

Firstly, the systems with many small impulse engines are characterized by a very bad ratio of fuel mass and total impulse to total mass and total volume. As a result only a very limited maximum thrust integral depending on the number of the impulse engines located in the same azimuth is available. An pulsed thrust generation associated therewith can result in natural vibrations of the missile. Such arrangements require rolling missiles.

The only limited suggestibility of the gas generation (and therefore of the thrust or rather the idle consumption) by using the pressure dependence of the combustion rate of the solid fuel is also disadvantageous.

A wide control range of a solid fuel gas generator induces a very high maximum working pressure and associated therewith a large mass of combustion chamber and valve control system.

A further disadvantage is that the combustion rate and therefore the gas generation rate are heavily depending on temperature. Because of this, for long front burners a cone-shaped combustion surface, in particular by heat input via the sidewalls during a long combustion period, also occurs.

The above-mentioned arrangements using solid fuel gas generators are not stable in particular for a total operating period of more than about 10 seconds.

With a long burning period and heavily changing thrust requirements several propellants or propellant cartridges are usually needed, requiring additional interfaces which increase the complexity for their part.

Moreover they require a considerable thermal insulation and thereby increase the mass to be transported which reduces the manoeuvring characteristic of the missile.

Liquid fuels which in case of an accident escape, easily evaporate and produce highly flammable mixtures with air normally cause a violent combustion. Not burned fuel residues must costly be disposed.

Liquid fuels are very toxic, carcinogenic, mutagenic and can be handled only obeying special precautions.

In principle the same applies to the oxidizers which furthermore must also be separated from the fuels in most careful manner. Also the oxidizers of the self-igniting systems, $N_2O_4$, $H_2NO_3$ and mixtures of $N_2O_4$ and NO are substances difficult in handling and using.

Consequently, liquid fuels in total are of environmental concern; in particular this applies for the hydrazine frequently classified as a critical substance and its derivates.

Moreover liquid fuels pose considerable requirements to the impermeability or rather tightness of gaskets and connections.

Due to their aggressive chemical composition the fuel mixtures used so far not are not well compatible with many materials.

Based on these disadvantages of prior art therefore the following tasks result inter alia:

One task is to enable a device and a system using environmentally friendly fuels which in particular substitute the hydrazine classified as a critical substance under REACh and its derivates without performance loss.

The fuel to be used should also enable lower requirements to the impermeability of gaskets and connections for the storage of the device during longer periods.

Further the fuel should be well compatible with many materials.

Furthermore over a wide combustion pressure range of the fuel to be used and by selection and constructive design of components, a control of fuel mass flow and combustion chamber pressure should be enabled which is largely independent from each other and which can provide an extent of thrust control which reaches far beyond the represented, in prior art available, achievable possibilities.

The effectiveness of the system should further remain high by means of an optimal fuel exploitation.

The volumetric effectiveness on system level should be improved compared to the performance level of prior art.

Further on a smoother thrust development should be strived.

The device should considerably be superior to the systems used in prior art, in particular for a longer total operating period of more than about 10 seconds.

A further task is to achieve technical and performance-related advantages, particularly for trajectory and/or position control systems for missiles, compared to prior art. Trajectory and/or position control systems are preferably activated by missiles when the aerodynamic control does not generate sufficiently high forces, e.g. at rest or low velocity, during a flight at high altitude with low pressure or even outside the atmosphere, during very fast control manoeuvres requiring very high forces. The same applies, when the aerodynamic control operates too slowly, e.g. in case of a high requirement to the agility, if direct hits onto small or heavily manoeuvring targets shall be achieved, or when it is even not possible, because aerodynamic control surfaces cannot be integrated or are undesirable.

Expressed in simple terms, the trajectory control here refers to the actual trajectory of the missile, whereas the position control, expressed in simple terms, shall maintain or aim at a specified position of the missile or "kill vehicles" in space. The disturbances to be counterbalanced can originate from outside or also from the effect of the DCS.

More particularly, the invention should be usable in particular also for a transverse thrust system like the Attitude Control System ACS or the DACS=Divert and Attitude Control System with or without kill vehicle, thus for a trajectory control system, a position control system and its combination at low or high air altitude, at low or high velocities of the missile, necessity of faster reactions, for example in the endgame.

The thermal design of the propulsion unit is supposed to be improved.

Furthermore it is the objective to reduce the mass to be estimated for the thermal insulation compared to solid fuel gas generators.

The form of the essential propulsion parts, tank and combustion chamber, should be freely selectable, thus not dictated by the fuel characteristics and the propellant geometry for solid fuel gas generators as in prior art.

In general, but particularly for the ACS/DACS, it should be possible to arrange the components of the combustion chamber, the nozzle systems, the tank and the pressurization system necessary for satellites, spacecrafts, missiles and aircrafts freely according to system requirements.

A further set of tasks results from the fact that the technology used in aerospace is characterized by being focussed on individual projects mainly, which results in a fragmentation of the respectively used technical solutions with the effect that a cross-system technology is widely not existing:

This is related to the in aerospace ruling different requirements and conditions.

For example, satellites and other spacecrafts are subject to other operating conditions than missiles or aircrafts.

The most common usage of trajectory control and position control systems can be found in the space sector, whether it be for satellites or other spacecrafts.

The systems established in space domain can be characterized by the following features:
  very often very low thrust in the range of 0.5-20 N for the position control;
  low thrust of 200-400 N for the trajectory control;
  use of liquid propellants operated with hydrazine or its derivates in the one-component mode; for engines with thrust above 10 N also two-component engines are deployed using preferably $N_2O_4$ as an oxidizer; the here available specific fuel effectiveness, i.e. the mass-specific impulse, is higher, in return the two-component system is more complex than the one-component system;
  the position control engines must generate great many small impulses over a period of many years; the one-component systems operate with catalytic disintegration of hydrazine, the two-component engines in the hypergolic, i.e. self-igniting, mode;
  mostly the thrust control occurs by means of the impulse length during nominal thrust operation, wherein for some systems the nominal thrust also decreases with decreasing fuel reserve because of the feeding or rather conveyance pressure drop in the fuel/oxidizer tank caused hereby.

The operating conditions are different for missiles. For missiles, the aerodynamic control of which for the stabilization, position control and trajectory control is sufficient in wide areas, it may be necessary to provide a small, but very quick trajectory correction in the last portion of an encounter with a flying object, usually within the last seconds, to achieve a direct hit. Essential features of these systems are:
  very high thrust, if the thrust effect runs through the centre of gravity of the missile;
  direct effect on the trajectory without using aerodynamic forces, except the induced aerodynamic forces caused by the interaction of control jet-incident flow;
  medium to high thrust for a quick change of the missile's position in order to enable a faster effect of aerodynamic forces; the force for the actual change of trajectory is aerodynamically generated.

Both continuously operating systems and arrangements of shortly firing impulse engines are used for missiles:
  a system uses a solid fuel gas generator whose gas is distributed among four nozzles; according to the short operating period of a few seconds the gas production can remain constant, the reactive or rather idle usage is negligible in relation to the simplicity of the system; the resulting thrust is generated by different thrust levels of the individual nozzles;
  THAAD uses a system with liquid fuel from space technology; a central gas generator supplies four thrust nozzles; small peripherally arranged engines from space technology control the position of the upper stage;
  the already mentioned system PAC 3 uses a plurality of small impulse engines arranged at the circumference which are ignited as necessary when the engine is oriented opposite to the direction of the desired thrust vector; in order that as many engines as possible can be used, the missile must roll; according to rolling rate therefore the combustion period has to be in the order of 10 ms, so that the azimuth angle scanned during the combustion remains limited; this implies a very strong increase and decrease of the thrust which can excite natural vibrations of the missile and affect the control.

Aircrafts having both qualities of missiles and qualities of spacecrafts are collision aircrafts, so-called "kill vehicles", which are intended to hit ballistic warheads in the high atmosphere or outside the atmosphere and therefor to defend them. Depending on system design, in particular the extent of the area to be defended, the required operating period ranges between
  10 seconds for interception events within the deeper atmospheric layers (about <30 km);
  several minutes for interception points in the middle section of the ballistic trajectory of the attacking warhead.

The trajectory control must be executed without aerodynamic support and therefore requires
  large thrust, depending on the mass of the kill vehicle;
  precise thrust control, also with regard to an increase and decrease of the thrust;
  stable combustion and thrust control;
  thrust vector orientation by the centre of gravity of the kill vehicle to minimize position changes by the action of the trajectory clanging engines.
  controllable systems with small reactive or idle usage or systems capable of being switched off and re-ignited which reduce the total fuel consumption and therefore the take-off mass of the kill vehicle, because the full thrust of the trajectory control is needed mostly only for a small portion of the total operating period.

The position control must orientate the kill vehicle such that the sensors can control the interception manoeuvre and the trajectory control engines are orientated correctly. Generally, the position control requires a substantially smaller thrust than the trajectory control. The position control engines are
  as far as possible peripherally arranged to achieve maximum lever arms;
  substantially more often, distributed over the complete flight time, in action than the trajectory controlling engines.

Known systems are
the system in the kill vehicle of the missile Standard Missile SM-3 operated with a solid fuel gas generator and downstream valves or rather nozzles;
a kill vehicle using individual engines operated with hydrazine.

For all these applications in the space sector, for missiles and aircrafts the previous prior art has attempted to develop solutions with different fuel and functional concepts which each on its own however have significant deficiencies as already shown.

Therefore, there is a further set of tasks to provide a device and a system providing on the one hand a trajectory control and/or a position control for such satellites, spacecrafts, missiles and aircrafts, for all these applications and operating conditions.

On the other hand, this device and this system should also be able to meet further purposes or rather additional functions, such as the capability of switching off and re-igniting the rocket engine, the enabling of a very strong, variable thrust, if necessary, with an additional transverse thrust system, a thrust vector control, an aerodynamic control, the enabling of gas generators for pressurizing devices or for driving actuators, turbines, engines and other working machines with the capability of switching off and re-igniting, very strong variable gas generation and, where appropriate, in connection with an additional system, which reduces the combustion temperature.

SUMMARY OF THE INVENTION

The individual and overall tasks are achieved with a device according to claim 1 and a system according to claim 19. Advantageous configurations are presented in the dependent claims.

For this purpose the invention comprises an apparatus and a system using a gel fuel, a controllable rocket engine or gas generator as well as a tank system whose configuration will be described in more detail below. Thereby, the invention can likewise be used for trajectory controls as well as for position controls of missiles.

The essential components of the apparatus according to the invention with all capabilities of regulating the gel mass flow and thereby the thrust comprise:
at least one conveyance system which can include a gas generator or a pressurization tank,
at least one tank, preferably a gel tank
at least one regulator valve for regulating the mass flow of the fuel
at least one injector head
at least one combustion chamber
at least one thrust nozzle adjustable, if needed The greatest part of the engine is the gel fuel. The embodiment according to the invention has a tank with a cylinder and with an internal piston system. The piston is set under pressure by the gas and conveys the gel through a regulator valve or regulator valve system into the combustion chamber.

The gel mass flow into the combustion chamber is adjusted by a regulator valve. However the mass flow also depends on the pressure difference between gel tank and combustion chamber.

This tank form may be appropriate for rocket engines like ACS/DACS. For other missile systems spherical tanks and a pressurization with metal membranes are also possible.

For gel propulsions a wide control range (15:1) can be realized, wherein these numbers in their order indicate the ratio of maximal thrust to minimal thrust. The droplet size is an important parameter for a stable gel combustion. But with consistent number of the injectors and decreasing mass flow rate the spraying behaviour becomes more and more worse or rather a combustion isn't possible any more.

In order to keep the jet velocity as constant as possible, an injector head, also referred to as "Einspritzkopf" in German, with injectors capable of being switched off and on can be used. As a side effect such a system can also be applied for the regulation of the gel mass flow.

With regard to DACS/ACS systems in particular, a gel fuel system according to the present invention makes is possible to realise a highly agile missile with short response times in atmospheric and exo-atmospheric space.

By means of the regulator valves in the gel feeding according to the invention the fuel requirement for the needed thrust can be achieved optimally without blowing off excessively produced gas. This is the case e.g. for solid gas generators in systems as they can be designed according to the invention. Thereby the fuel carried along can be minimized.

By an adjustable nozzle, preferably by several adjustable nozzles, a thrust vector in any direction can be generated. By changing the mass flow rate the force of the thrust vector is adapted to the requirements. The flow areas of each thrust nozzle can be controlled such that the thrust nozzles are always operating with high efficiency.

The apparatus according to the invention preferably uses six thrust nozzles to perform rolling, pitching and transverse movements. The thrust nozzles can be operated in an arbitrary combination to align the seeker head with the target and to guide the missile into the target.

The present invention promotes the shown prior art such that the new apparatus and the new system, reaching beyond the technical construction, provide
newly introduced characteristics and functions as well as extended application possibilities,
in connection with a smaller damage potential in case of an accident,
and all of this with a significantly improved environmental friendliness.

The apparatus and the system described in more detail below enable the usage of environmentally friendly gel fuels which particularly substitute the hydrazine classified as a critical substance under REACh and its derivates without performance loss.

The wide range of combustion pressure of selected gel fuels and the usage of a controllable injector, controllable and/or adjustable nozzle and therefore a control of fuel mass flow and combustion chamber pressure, largely independent of each other, allow a degree of thrust control which reaches far beyond the shown, in prior art available, achievable possibilities. The effectiveness of the system hereby remains high by means of an optimal fuel exploitation.

The gelling quality of the fuel also poses lower requirements to the impermeability of gaskets and connections for the storage of the device over longer periods.

Before start-up the system of fuel and combustion chamber, in particular the DACS system of fuel and combustion chamber, is unpressurized. Therefore only small requirements to the gaskets of this system exist because the gel fuel cannot trickle off through leakages without internal pressure. For example O-ring gaskets, flat gaskets of a simple type etc. can be used here.

If small quantities leak out yet, this does not pose a threat for humans and environment, nor for the integrity of the material.

The gel fuel does not significantly change its characteristics in contact with the atmosphere. Therefore, a hermetical or nearly hermetical containment of the fuel like e.g. for solid fuels is not required.

The gel fuel mixtures are well compatible with many materials in particular considering the one-component principle.

Compared to the performance level of prior art the volumetric effectiveness on system level is dramatically improved.

In addition, there is the smoother thrust development by a virtually continuous operation or thrust impulses changing in a controlled manner.

In particular, due to the separation of tank and combustion chamber the invention is significantly superior to the solid fuel systems used in prior art, in particular for a longer total operating period of more than about 10 seconds.

More particularly, it will enable a very fast and uniform control of the combustion pressure and thus of the thrust level so that the invention can be used particularly also for a transverse thrust system such as the Attitude Control System ACS or the DACS=Divert and Attitude Control System with and without kill vehicle, consequently for a trajectory control system, a position control system and its combination at low or high air altitude, for low or high velocities of the missile, the necessity of fast reactions like in the endgame.

In terms of the present invention any satellites and other spacecrafts, rockets, guided missiles, high altitude research rockets, satellite rockets, military rockets, drones, aeroplanes, aircrafts are considered as missiles. This listing is only exemplary. Likewise it is irrelevant whether these are land-based, sea- or ship-based, vehicle-based, man-based, air- or orbital-based.

The separation of tank and combustion chamber simplifies the thermal design compared to the principle of solid fuel systems used in prior art and reduces or avoids the mass estimated for the thermal insulation. Additionally, the shape of the tank and the combustion chamber is freely selectable, consequently not dictated by the fuel characteristics and the propellant geometry like in prior art.

The components, according to the invention, combustion chamber, nozzle systems, tank and conveyance system which can be configured as a gas generator or pressurization system can be arranged in the ACS/DACS very freely according to system requirements.

Advantageously they are constructed in a modular manner. Furthermore they can be scalable according to the respective operating conditions, in particular the size of the missile.

The apparatus according to the invention and the system according to the invention present their advantages in particular for trajectory and/or position control systems for missiles.

Trajectory control and/or position control systems are preferably activated by missiles when the aerodynamic control does not generate sufficiently high forces, e.g. at rest or low velocity, during flight at high altitude at low pressure or even outside the atmosphere, during very fast control manoeuvres requiring very high forces. The same applies if the aerodynamic control operates too slowly, e.g. for strong requirements to the agility, if direct hits onto small or heavily manoeuvring targets should be achieved, or when it is even impossible because aerodynamic control surfaces cannot be integrated or are not desired.

Furthermore the technology presented below in the detailed description for the exemplary operation purpose of the trajectory and/or position control can obviously be used also for other purposes, individually or together, e.g. without claiming completeness:

for gel fuel rocket engines with a device capable of switching off and re-igniting the rocket engine;

very strong variable thrust;

where appropriate, in connection with an additional transverse thrust system, e.g. for a fast re-direction or rather direction change immediately after an undirected take-off, e.g. a vertical take-off;

where appropriate, in connection with a thrust vector control for which gas is branched off from the combustion chamber of the rocket engine and laterally blown into the thrust nozzle of the rocket engine to generate transverse forces acting on the nozzle wall by flow stripping;

where appropriate, in connection with a thrust vector control for which gas is branched off from the pressure gas tank or gas of a solid fuel gas generator of the tank pressurization system and laterally blown into the thrust nozzle of the rocket engine to generate transverse forces acting on the nozzle wall by means of flow stripping;

where appropriate, in connection with a thrust vector control or an aerodynamic control for which gas is branched off from the pressure gas tank or gas of the solid fuel gas generator of the tank pressurization system and is used for driving the pneumatic actuators; if the systems can deal with high gas temperatures, the gas of the rocket engine can also be used;

where appropriate, in connection with a thrust vector control or an aerodynamic control for which gas is branched off from the pressure gas tank or gas of the solid fuel gas generator of the tank pressurization system and is used for driving the hydraulic system for the actuators; if the systems can deal with high gas temperatures, the gas of the rocket engine can also be used;

where appropriate, in connection with a device including a generator for producing electric current, for which gas is branched off from the pressure gas tank or gas of the solid fuel gas generator of the tank pressurization system and is used for driving the generator, preferably by means of a turbine, but where applicable also another engine; if the systems can deal with high gas temperatures, the gas of the rocket engine can also be used.

All of these additional functions can also be fulfilled by the trajectory and/or position control systems.

Further on, the technology presented for the exemplary purpose of trajectory control and/or position control can, individually or together, obviously be used for other purposes, e.g. therefore without claiming completeness, for gel fuel gas generators for feeding or pressurizing devices or for driving actuators, turbines, engines or other working machines with:

a device capable of switching off and re-igniting the rocket engine;

very strong variable thrust;

where appropriate, in connection with an additional system, which reduces the combustion temperature by mixing with ambient air, adding and, where applicable, vaporizing of water or another liquid, using a heat sink or an endothermal phase transition of a solid, gel or sludge or another appropriate substance;

where appropriate, in connection with an additional system which reduces the combustion temperature by mixing with a portion of the pressurization gas carried along.

DETAILED DESCRIPTION OF THE INVENTION

The invention will described below on the basis of a trajectory control and/or position control system operated with gel-like fuels.

The trajectory control and/or position control system according to the invention comprises the following components:
- at least one conveyance system which can include a gas generator or a pressurization tank,
- at least one tank, preferably a gel tank
- at least one regulator valve for regulating the mass flow of the fuel
- at least one injector head
- at least one combustion chamber
- at least one thrust nozzle which can be regulated and/or adjusted, if needed.

A device designed for receiving and burning a gel-like fuel is provided.

In principle, here the constructive configuration is at will of those skilled in the art and substantially depends on the respective operating conditions like e.g. the type of the missile, the flight distance to be covered, the size of the missile, spatial conditions. Details thereof will be explained below.

The gel fuel is such that the combustion temperature reached during burning does not thermally overstress the structural components, in particular the control elements of the gas flow, during the design-related operating period. Preferably the gel fuel is formulated such that the combustion temperature can be adjusted within a very wide range of about 1300-3000 K.

Furthermore the gel fuel used in the system according to the invention is preferably such that it produces only few particles and above all no deposits on structural components and control elements.

Furthermore, a configuration of the gel fuel is preferred such that it burns within a wide pressure range uniformly, i.e. without causing pressure vibrations (combustion instabilities) generated by the combustion.

A further preferred configuration of the gel fuel is formulated such that a very fast and uniform control of the combustion pressure and hence the thrust level is enabled.

The gel fuel to be used is environmentally friendly and can be handled, stored, transported and used well. This also includes the quality of the produced gases.

No personal protection equipment to a greater extent than normal is required for the production and handling.

Furthermore, the quality is preferably such that a sufficiently high degree of insensitivity is provided in case of disaster or damage by attacks.

However, the trajectory and/or position control system according to the invention is not limited to the receipt and combustion of a gel fuel in a configuration as a monopropellant. In fact gel fuel systems with the quality of two-component or multi-component systems with environmentally friendly oxidizers or self-igniting two-component systems with environmentally friendly oxidizers can also be used. The use of such two-component systems is readily possible and essentially depends on parameters like power, mass, complexity, costs.

The gel fuel preferably contains no etching or in contact very toxic ingredients.

If the gel fuel is filled into one or more fuel bags, these preferably consist of a polymer material, where appropriate reinforced by fibrous tissue, in particular textile, carbon fibre, aramide fibre, or of other polymeric or mineral fibres if the fuel bags are designed inflexible. Elastically flexible fuel bags are also possible; their shape during emptying will partly be predictable by the combination of inertial forces of the fuel filling during acceleration and tension forces caused by the stretching of the fuel bag.

As gelled fuel it can be handled with normal common protection equipment (no protective suit, no respiratory protection).

Preferably, no etching gases are produced which could damage the valves and nozzles.

Preferably, the gel fuel is REACh compatible.

DACS are generally used in apparatuses experiencing or intending accelerations in all directions which also depend on the use and cannot be predicted during operation generally. Gel-like fuels do not slosh to and fro and the shift of the centre of gravity remains uniformly linear and predictable in the course of the delivery.

An embodiment of the gel-like fuel can comprise the following composition:

The gel-like fuel is based on an at ambient temperature liquid hydrocarbon containing at least one nitro group, where applicable also on a mixture of such hydrocarbons.

The feeding or rather conveying apparatus for the gel-like fuel can exclusively consist of inert components.

But it is also possible to provide a solid gas generator working pyrotechnically or a mixed form of a high pressure gas reservoir with a pyrotechnically operating gas generator for the tank pressurization.

The hydrocarbon containing the at least one nitro group can be an aromatic or aliphatic hydrocarbon, for example an alkane substituted with one or more nitro groups. Thus nitroethane and especially nitromethane have turned out to be appropriate.

The at ambient temperature liquid hydrocarbon is added with a gel forming agent to transform it into the gel form. This gel forming agent can be an anorganic gel forming agent, e.g. pyrogenic silica like Aerosil® or an organic gel forming agent, for example so-called LMOGs (low molecular mass organic gelators).

The engine can also be implemented as a two-component engine, where applicable a multi-component engine, preferably with a fuel gel and an oxidizer, also preferred in gel-like form.

Thereby a water-soluble salt based on nitramide or nitrate, where appropriate also a mixture of such salts, is preferably used as an oxidizer. For gel forming, for example an aqueous solution of one or more such salts is preferably used which is mixed with one or more gel forming agents and, where applicable, with further additives. The concentration of the salt or rather the total concentration of the salts in the aqueous solution can for example be 20 to 90% by weight. Instead of pure water, the salt can also be dissolved for example in a mixture of water and a water-soluble solvent such as an alcohol.

As water-soluble salts, e.g. alkaline or alkaline earth salts can be used, however ammonium or hydroxyl ammonium salts are preferably used. It has turned out that ammonium dinitramide and hydroxyl ammonium nitrate are particularly suitable as oxidizers.

The gel-like fuel comprising a fuel based on an at ambient temperature liquid hydrocarbon containing at least one nitro group and a gel forming agent is not explosive. Therefore, it has an insensitive behaviour in case of damage or accidents.

In a different composition the gel-like one-component fuel contains a mixture of at least one monergol basic fuel, namely a hydrocarbon containing at least one nitro group, at least one gel forming agent and at least one solid oxidizer.

By adding the solid oxidizer both the specific impulse and the density and therefore in particular the volume-specific impulse of the fuel is increased which enables smaller and thus lighter fuel tanks and consequently smaller and lighter pressurization systems compared to known gel-like and in particular liquid fuels.

The at least one nitro group containing hydrocarbon forming the monergol basic fuel has at most eight carbon atoms per molecule and is liquid at ambient temperature. Preferably the hydrocarbon containing the at least one nitro group is formed by nitromethane or nitroethane.

The percentage of the monergol basic fuel in the gel-like fuel preferably amounts to at least 30% by weight, in particular at least 45% by weight.

In order to form a gel from the liquid monergol basic fuel it is mixed with a gel forming agent. As gel forming agents silica, in particular pyrogenic silica, for example Aerosil®, can be used. Organic gel forming agents or carbon-based gel forming agents are especially preferred. The organic gel forming agents can be LMOG gel forming agents (low molecular mass organic gelators). The gel forming agents made of carbon can consist of carbon particles or carbon nanotubes.

The oxidizer formed by a solid preferably consists of at least one compound of the group: ammonium perchlorate, ammonium nitrate, ammonium dinitratamide and a highly explosive substance. Preferably, the highly explosive substance is octogen (HMX), hexogen (RDX) and/or diaminodinitroethylene (FOX-7).

The percentage of the oxidizer in the gel-like fuel preferably amounts to at least 1% by weight, in particular at least 20% by weight and preferably at most 70% by weight, in particular at most 30% by weight.

In order that the oxidizer can be well mixed with the monergol basic fuel and does not sediment in the gel-like fuel even after longer storage period it comprises a mean particle size of preferably at most 0.4 millimeter, in particular at most 0.09 millimeter. The fine oxidizer particles are therefore kept suspended in the gel structure of the fuel for a very long period.

The particulate oxidizer can also contribute to minimize the required quantity of the inert gel forming agent. The oxidizer oxidizes a part of the hydrocarbon proportions of the monergol basic fuel and the gel forming agent, as long as the gel forming agent is an organic gel forming agent or a carbon-based gel forming agent.

The mixing ratio of the oxidizer to the hydrocarbon containing the at least one nitro group and, provided that the gel forming agent is an organic gel forming agent or a carbon-based gel forming agent, is preferably selected such that the gases resulting in the course of the reaction are slightly below balance or rather depleted, i.e. slightly rich in fuel, thus reducing, because such gases do not oxide the structure of, for example, the combustion chamber and the nozzle of a rocket, and hence the stability of these structures is improved.

The gel-like fuel charged with oxidizer particles according to the invention can be conveyed, injected and burned like a normal gel-like fuel.

Also with this configuration of a gel-like fuel a significant improvement of the specific impulse is achieved. Therefore, one-component or mono-propellant engines can be realized having an only slightly reduced specific impulse compared to the introduced two-component or bi-propellant engines with at a same time a substantially more simple system architecture and at a same time a substantially easier manageable and more environmentally friendly fuel. Here the improvement of the density of the fuel according to the invention compared to a conventional mono-propellant for one-component engines is enhanced by a factor of 1.15 to 1.2. Compared to the introduced bi-propellants for two-component engines the density of the fuel according to the invention is higher by a factor of 1.15 to 1.2 enabling smaller tank volumes.

In a further composition an additive is added to the gel-like fuel in order to reduce the high combustion temperature of the gel-like monergol fuel, wherein by the combustion of the fuel the carbon is oxidized to carbon monoxide (CO) and no oxygen is available for the oxidation of hydrogen ($H_2$) to water ($H_2O$) and of carbon monoxide to carbon dioxide ($CO_2$) or it disintegrates under formation of nitrogen.

That is, the additive influences the combustion of the fuel such that carbon monoxide and hydrogen are produced instead of carbon dioxide and water. According to the invention therefore from the monergol fuel at least a part of the carbon and the hydrogen which would have been burned to carbon dioxide and water without the additive is only incompletely burned to carbon monoxide and transformed to hydrogen. By means of the additive a lack of oxygen is hence caused by which for example a hydrocarbon or hydrocarbon residue is transferred only to carbon monoxide and hydrogen during the combustion and is not completely burned to carbon dioxide and water.

Thus a gas mixture results from the combustion gas of the monergol fuel for which on the one hand the temperature is substantially reduced by the incomplete combustion of the fuel caused by the additive and which on the other hand contains a high proportion of carbon monoxide (CO), hydrogen ($H_2$) and nitrogen ($N_2$), thus gases whose characteristics approximate an ideal gas and therefore do not condense over very wide temperature and pressure ranges, while the proportion of water ($H_2O$) and carbon dioxide ($CO_2$) whose characteristics significantly differ from ideal gases and therefore condense under high pressure at considerably lower temperatures, is small.

Hereby as a monergol fuel a fuel is preferably used which contains at least one, at ambient temperature liquid, at least one nitro group containing hydrocarbon, for example nitromethane or nitroethane. The gel forming agent can be pyrogenic silica or a LMOG (low molecular mass organic gelator) for example or formed by carbon nanotubes. The gel-like fuel can further contain metal particles, preferably aluminium or magnesium, for energy enhancement, also particles of energetic materials.

The percentage of the additive can for example amounts to 5-30% by weight of the fuel for the gas generator.

The additive can be a substance liquid at ambient temperature, thus the operating temperature of the gas generator, i.e. for example at 0 degree to 40 degree Celsius, or a particulate solid.

The additive can be an organic compound, hence a carbon-containing liquid or solid compound. Whereas a liquid additive is easier with respect to the production process, the density of the fuel can be increased by means of a solid particulate additive enabling smaller tank volumes with equal gas yield.

The additive can be a hydrocarbon or an organic compound containing a carbon, hydrogen and oxygen and/or nitrogen. The hydrocarbon can contain for example 5 to 12 carbon atoms per molecule. The hydrocarbon can be a saturated or unsaturated, a linear or branched, a cyclic or polycyclic hydrocarbon, hence for example heptane, octane, isooctane or cyclohexane.

The organic compound containing carbon, hydrogen and oxygen can be a compound comprising an alcohol, ether, ester, ketone, aldehyde or a carboxyl group or a heterocyclic compound.

The carbon, hydrogen and nitrogen containing compound can be a heterocyclic compound or a compound containing at least one nitro group or at least one amino group. The amino group containing compound can be urea.

Instead of or additionally to the additive by which the monergol fuel is at least partially transformed only to carbon monoxide and hydrogen in the combustion, the additive can be a substance which disintegrates to nitrogen during the combustion of the monergol fuel, hence in particular an azide, for example sodium azide.

Preferably the additive is added to and mixed with the gel-like fuel. For improving the combustion reaction, however, the additive can also completely or partly be brought in contact with the initially hot combustion gas in a post-combustion zone or chamber which gas is formed by the combustion of the gel-like fuel stored in a separate container. The hot combustion gas then reacts in the post-combustion zone or chamber to which the additive is fed such that in turn gas with reduced temperature is formed.

This means that the carbon dioxide ($CO_2$) and water ($H_2O$) in the combustion gas formed during the combustion of the monergol fuel are at least partially transformed to carbon monoxide (CO) and hydrogen ($H_2$) in an endothermal manner, hence reduced, in the post-combustion zone or chamber.

In doing so many methods are possible, namely: one, two or multi-fuel systems, the complete or partial mixing of the additive into the fuel, the fuels or oxidizers, which burn in the first combustion zone, or the complete or partial addition of the additive in pure or mixed form in a region after the first combustion zone where a post-reaction occurs.

The conveyance of the fuel can occur by means of a gas generator or a tank pressurization system, for example by pressurization with gas or a mechanically driven piston in the storage container of the fuel. Here gas generator or rather tank pressurization system are not necessarily considered as components functionally independent of each other, but can functionally cooperate with each other.

The terms gas generator and tank pressurization system consequently relate to the conveyance system with a view to the conveyance of the fuel within the apparatus according to the invention and are thus understood as synonyms.

The combustion of the fuel can occur by means of injectors in a combustion chamber.

Besides the additive the gel-like fuel can still contain further liquid and solid additives. The advantage of solid additives including the additive which transforms carbon dioxide and water resulting from the combustion of the monergol fuel to carbon monoxide and hydrogen in an endothermal manner is that it must not be mixable with the monergol fuel or gel-like fuel.

Due to the significant oxygen depletion of the fuel of this composition the combustion gases do not oxide the structures of the working machines, tanks and pipes which improves their lifetime and resilience.

With the fuel according to the invention a substantially improved stability of the working machines, containers and pipes applied by the combustion gas is achieved due to the reduction the combustion temperature. Additionally the yield of reaction products behaving like ideal gases over wide temperature and pressure ranges is improved. The fuel density can be increased by the addition of a particulate additive. It is possible to use also substances which cannot be mixed with the monergol fuel, if these are added in solid particle form. The fuel can be used for the thrust generation at transverse jet control apparatuses of aerospace devices.

In an embodiment of this above-described further composition a fuel was formed of nitromethane with carbon nanotubes as gel forming agent and 10 percent by weight of heptane. According to the calculation with the ECT Thermodynamic Code of Fraunhofer Institute for Chemical Technology ICT the burning temperature decreases from 2197 to 1450 K at a constant pressure of 100 bar, wherein the percentages of carbon dioxide ($CO_2$) and water ($H_2O$) are reduced by about 50% with an increase of about 50% of the proportion of carbon monoxide (CO) and hydrogen ($H_2$) with constant nitrogen portion.

The three gel fuel compositions above can also be combined with each other.

The trajectory and/or position control system according to the invention comprises a controllable rocket engine or gas generator as a further component.

This component preferably has a fuel flow control valve, an injector head with preferably variable injectors, a combustion chamber and one to several outflow nozzles with preferably variable nozzle throat cross-section.

These elements can all together or, according to application requirements, individually be part of the controllable engine.

They are described below:

The fuel flow control valve is closed before the start of the engine and is opened as soon as the gel fuel shall be conveyed into the combustion chamber.

The constructive design of the fuel flow control valve in principle is at will of those skilled in the art and complies with the following characteristics, functions and descriptions of the type of this device:

The fuel flow control valve is preferably configured such that highest dynamic requirements to the flow control can be met. In a possible embodiment it has a highly dynamic, directly actuated one-way or multi-way proportional valve and a control unit including the complete control electronics and sensor system. The fuel flow control valve exactly controls or regulates the flow-rate and responses to disturbance variables from outside within a very short time. The high precision is achieved for example by the internal acquisition of the flow-rate by means of sensors. The actual volumetric flow-rate can preferably be controlled directly and adapted to the changed conditions quickly.

Due to the use of a preferably completely digital control electronics and an interface the fuel flow control valve can be adapted to the most different applications. The convenient start-up can be achieved by software. Also a diagnose of the fuel flow control valve is preferably possible, for example by installed LEDs or software.

The state "closed" can be accomplished by the fuel flow control valve itself. But it can also be ensured by an additional valve, e.g. a pyro-valve with a bursting membrane or another valve. By using such an additional valve the requirements to the tightness of the flow control valve are lower. However it is to be considered that the fuel tank is pressureless during the storage period and till initiating the starting process and the gel fuel is illiquid.

Further on, the flow control valve is preferably configured such that it has a linear characteristic and a precise control behaviour over the complete mass flow range.

The preferred valve design has a linear control characteristic.

Further possible types are needle valves, squeezing valves, piston slide valves and double-seat valves.

But also a simple ball valve could successfully be used for more simple applications.

The flow control can also be performed by means of two or more parallel connected valves which only close and open. Here shut-off valves or shut-off flaps are also possible.

The driving can be performed both electrically and hydraulically as well as pneumatically or mixed or as a servo control or in another appropriate manner according to what is most advantageous from the system's point of view.

Advantageously gas from the preferably existing tank pressurization system is used.

In a binary or two-component system the above-mentioned items equally apply for an oxidizer valve.

Furthermore the trajectory control and/or position control system according to the invention with its rocket engine or gas generator preferably includes an injector head.

The constructive design of the injector head in principle is at will of those skilled in the art and complies with the following characteristics, functions and descriptions of the type of this device.

Preferably the injector head includes one or more injector elements. Previous experiments revealed that the thrust correlates well with the number of injector elements and therefore the fuel mass flow. At nominal conditions about 130 g gel fuel flows through an injector element in the preferred design generating a thrust of about 300 N or more depending on the gel fuel.

Corresponding to the nature of the gel fuel baffle injectors are the preferred solution.

Gel-like fuels at rest behave like solid substances. Under the influence of shear stress they become more and more flowable with increasing shear stress in terms of shear-thinning Non-Newtonian fluids. Their spraying behaviour is similar to that of liquid fuels in wide areas. The combustion chamber process is similar to the process with liquid fuels. The spraying can occur by means of a baffle injector.

Further characteristics, functions and components of the injector head preferably are the presence of fixed injector elements injecting the at least needed fuel mass flow for the basic load.

Furthermore injector elements are preferred which can be closed and opened. For small total fuel mass flow those will all be closed except one or a few of them so that despite of smaller total fuel mass flow the injection conditions of the active injectors further enable a good spraying and atomization.

It is possible to configure the control of the injection channels of the injector elements also such that the fuel mass flow can be controlled continuously. The preferred variant however is aimed at the on/off control because the spraying in the partially open state is not optimal—this should be ensured by the closable injector elements for the active injector elements—and a flow control by means of the fuel flow control valve can occur and because the pre-pressure variation resulting therefrom is already given additionally.

Different types of variable injector elements are possible.

Alike further different variants and combinations of shut-off devices, slides, rotary valves, piston slide valves, membrane, squeezing, needle, double-seat, ball or piston valves can be used.

The basic effect is the reduction of the flow area or preferably the closure of a channel according to the above-mentioned considerations.

For influencing and/or closing the gel fuel flow channel laterally or rotary movable slides, piston slide valves, axially slidable mandrels or constrictions, by channels variable in cross-section through shape changes or other methods—see above-mentioned valve types—can be used.

Preferably injector elements are used with which the individual channels of the injectors can completely be closed and opened.

The driving can be performed both electrically and hydraulically as well as pneumatically or mechanically or mixed or as a servo control or in another appropriate manner, depending on what is most advantageous from the system's point of view. Advantageously gas from the already present tank pressurization system is used.

Furthermore the trajectory control and/or position control system according to the invention has a combustion chamber.

Regarding shape and material the combustion chamber can be implemented in different designs:

The combustion chamber can be made of a heat-resistant material without internal thermal insulation or of a common metal material, preferably steel, with thermal insulation. This can for example be ceramic with or without filling materials or a polymer with or without filling materials, preferably a polymer of the category "silica-phenol" which is sticked or pressed into the metal structure.

The combustion chamber in the design as a metal combustion chamber preferably has alloys with a high melting point.

Preferred materials are steel and Ti alloys. High-melting-point metal alloys such as for example molybdenum alloys (TZM) or others are very appropriate from a thermal point of view, however very heavy, in particular at high operating pressure.

For structure materials not resisting the combustion temperature, a thermal protection can be used which is preferably formed of ceramic, e.g. oxide ceramics, nitrides, carbides or fibre-reinforced ceramic materials.

Depending on the application, if the emission of particles, in particular soot particles, should be allowed, ablating substances can also be used, for example filled or unfilled thermoplastics, KFK, silica-phenol, CFK, S-5000® and mixed forms of these materials, Dow-Corning 93-104® or similar materials.

The described metal combustion chamber can furthermore be provided and reinforced with a fibre composite, preferably carbon fibre reinforced plastic, if particularly high initial stresses, in particular a high combustion chamber pressure, exist.

The combustion chamber can also be implemented as a ceramic combustion chamber without internal heat shield, preferably of a fibre-composite ceramic material, also with an internal layer of a different material, e.g. oxide ceramics, nitrides, carbides or fibre-reinforced ceramic materials or ablating materials, as described above.

The described ceramic combustion chamber can furthermore be reinforced with a carbon fibre reinforced material, if particularly high initial stresses, in particular a high combustion chamber pressure, apply.

If no variable nozzle should be used, but a nozzle with a fixed nozzle throat is sufficient for the respective conditions, the structure of the combustion chamber can also include the nozzle at a same time.

If a specific resistant nozzle throat material is required, graphite, ceramic of different kind, in particular fibre-composite ceramic, or high-melting-point metal alloys are a good choice. As an example titanium-zircon-molybdenum, TZM, can be considered which has a high melting point, a high thermal stability, smaller thermal expansion, good thermal conductivity, good chemical stability.

The trajectory control and/or position control system according to the invention furthermore has one or more outflow nozzles.

By a controllable and/or adjustable nozzle, preferably by several controllable and/or adjustable nozzles, a thrust vector in any direction can be generated. By changing the mass flow rate the force of the thrust vector is adapted to the requirements. The flow areas of each thrust nozzle can be controlled such that the thrust nozzles are always operating with high efficiency.

The apparatus according to the invention preferably uses six thrust nozzles to perform rolling, pitching and transverse movements. The thrust nozzles can be operated in an arbitrary combination to align the seeker head with the target and to guide the missile into the target.

The nozzle or rather the nozzles is/are provided with a preferably variable nozzle throat cross-section.

The variable nozzles are configured such that the smallest cross-section can be changed from maximally open to minimally open or completely closed.

In trajectory control and position control systems the smallest cross-section of the variable nozzles is actively controlled.

In principle the variable nozzles can also be designed as a passive element preferably driven by the pressure difference combustion chamber-ambient pressure, such that the combustion chamber pressure remains roughly constant, which however would only make sense for a constant thrust vector direction, thus for a single nozzle per combustion chamber and thereby for a rocket engine, even though also in this case multiple nozzles are possible in principle and can be advantageous in a very constricted installation situation, where appropriate.

If the minimal smallest cross-section of nozzles is not equal to zero, the smallest possible fuel mass flow is performed at a pressure lower than the nominal pressure, thus at the combustion pressure minimal for the respective fuel.

Possible designs are for example:
nozzles with axially slidable central body in form of a mandrel, bulb nozzle, pintle nozzle;
nozzles with axially slidable nozzle throat over a fixed central mandrel, also acting as a bulb nozzle;
flat nozzles with a laterally slidable insert in the nozzle throat or with a fixed nozzle throat and laterally slidable nozzle diverters;
nozzles with a rotary slidable insert in the nozzle throat or with a fixed nozzle throat and rotary slidable nozzle diverter;
nozzles with a shutter-like variable nozzle throat;
nozzles with a nozzle throat in a design changing the smallest cross-section by shape change;
nozzles with blowing in of gas into the nozzle throat or its proximity around the smallest cross-section to achieve a constriction of the nozzle throat in a fluid-mechanical manner;
nozzles with injection of a evaporating liquid or a gel or a suspension into the nozzle throat or its proximity around the smallest cross-section to achieve a constriction of the nozzle throat in fluid-mechanical manner.

In special cases gas outlets not designed as thrust nozzles can also be useful; even though this is not the preferred design.

Another configuration is a throttle with variable cross-section arranged between combustion chamber and nozzles. Such an arrangement is advantageous if the combustion chamber pressure should be maintained at a higher level than the pressure targeted for the operation of the thrust nozzles.

If trajectory control and position control nozzles of the same gas generator are provided with gas, a possible design comprises (bigger) trajectory control nozzles which can preferably be closed completely if no thrust is required for the trajectory control, and partially closable position control nozzles whose minimal total cross-section is sized such that it corresponds to the minimal gel fuel mass flow at the desired combustion pressure.

Actuators can preferably be used for active controlling the mechanical nozzles. They can work electrically, hydraulically, mechanically or pneumatically or in a mixed form or as a servo control or in any other appropriate manner, depending on what is most advantageous from the system's point of view.

Advantageously gas from the preferably existing tank pressurization system is used. If tank pressurization gas is also used for driving a hydraulic system for the actuators this may lead to some increase of complexity: in return the hydraulic system operates with an approximately incompressible medium and therefore faster and more agilely.

The trajectory control and/or position control system according to the invention thus comprises a rocket engine or gas generator which can be regulated and controlled preferably by means of a control system comprising hardware and software.

Control algorithms serve for the preferably common control and regulation of fuel mass flow, combustion chamber pressure and cross-section of the nozzle outlets depending on the thrust requirement.

They ensure a pressure as constant as possible at variable fuel flow.

Furthermore they accomplish the adjustment of the operating pressure to the ambient pressure in an appropriate ratio, in particular at varying ambient pressure.

They are also responsible for the dynamic aspects of the trajectory control and/or position control system according to the invention.

If the apparatus according to the invention is used in connection with an additional transverse thrust system, e.g. for a quick re-direction immediately after an undirected take-off, e.g. a vertical take-off, the nozzle system in this preferred embodiment can comprise transverse thrust nozzles. This embodiment will be described below:

On the basis of manoeuvre commands the transverse thrust nozzles provide the required force for an accurate positioning of the missile for a collision with the hostile flying object.

In connection with the nozzle system an actuating system is preferably used enabling a very quick and uniform control of the thrust direction.

Depending on the requirements to the actuating time electro-mechanical, hydraulic, pneumatic or servo-pneumatic actuators can be used.

A hot gas pneumatic system which is supplied in terms of pressure from the transverse thrust (ACS) plenum is also advantageous.

The functioning of the actuators here depends on the gas generator used for the transverse thrust unit (ACS). The actuators are directly connected with the hot gas nozzles, preferably designed in pintle configuration, which control the thrust direction of the ACS. Likewise they are operationally connected with the also useable hot gas valves.

With the help of the actuating system a continuous controllability of the resulting thrust forces is ensured.

The thrust direction of the missile is influenced by the nozzles and the gas streaming out through them. Thus the missile change is not primarily, but only implicitly, influenced by the actuator. Implicitly, because the actuator has the responsibility that the gas streams out from the desired "correct" nozzle among the many nozzles so as to influence the thrust direction in a desired manner.

If the gas generator, e.g. a solid fuel gas generator, causes a constant mass flow the thrust direction of the transverse thrust unit can be controlled by the actuators controlling opposite pintle nozzles.

If a variable mass flow gas generator, e.g. a gel fuel gas generator, is used, the position and trajectory control occurs by the individual driving of the individual nozzles, wherein additional fuel is furthermore saved according to operating time. This effect is achieved because only those transverse thrust unit (ACS) nozzles are opened which are needed to provide the required thrust. All other nozzles remain closed so as to obviate the loss of gas which would stream out without being used. Additionally thereby the thrust direction and the pressure level in the plenum can also be controlled to realize long operating periods.

Thus the transverse thrust unit is supplied by a discretely or continuously operated controllable gas generator providing the plenum (still described below) and the nozzles with produced gas which accomplishes the necessary thrust direction.

In addition to the explained nozzles and the actuators, the construction further comprises a so-called plenum. The total mass flow from one or more gas generators is collected in the plenum and distributed therefrom to all nozzles. These individual hot gas pintles or hot gas valves then control the corresponding mass flows directed to them.

The interface between the missile and the transverse thrust unit (ACS) therefore represents the plenum.

The plenum, apart from its inlet and outlet, is a closed body which can have various geometries. For example, the plenum can be cylinder-shaped or pot-shaped. The material can be selected arbitrarily in consideration of the intended purpose.

The plenum and its construction are independent of the gas producing system of the missile respectively to be used or used. Therefore the plenum can be used for any types of gas generators. For this it is only necessary to use corresponding connectors or adapters.

By the configuration, according to the invention, of nozzles, actuators and plenum a separation of transverse thrust unit (ACS) or rather the kill vehicle with transverse thrust nozzles on the one hand and gas generator on the other hand is made possible. This means that such a construction enables the modular use in different missile concepts as well as an extension of the ACS system to a DACS system in a kill vehicle.

The components of the ACS/DACS system can be used as individual concepts for their integration in such missiles together with specific systems wherein the gas generator can freely be selected at the same time.

Control algorithms effect the controlling of the actuators and the pintle nozzles or the hot gas valves. By using controllable gas generators in the missile an additional regulation of the gas generator mass flow is advantageously possible to reduce the fuel consumption during long operating periods and phases of low ACS thrust requirements.

Advantageously the thrust system of the ACS also provides a pitch and yaw control for the interception.

The trajectory and position control system described above puts the missile into a commanded position within a given time period, as needed, and keeps it in this position within a defined accuracy of the complete system.

Hence the trajectory control and/or position control system according to the invention comprises a rocket engine or gas generator which furthermore comprises the tank system described below.

The embodiment according to the invention has at least one tank. This can be configured with a cylinder and an internal piston system. The piston is set under pressure by the gas and conveys the gel through a regulator valve or regulator valve system into the combustion chamber.

The gel mass flow into the combustion chamber is adjusted by a regulator valve. However the mass flow also depends on the pressure difference between gel tank and combustion chamber.

This tank form may be appropriate for rocket engines like ACS/DACS. For other missile systems spherical tanks and a pressurization with metal membranes are also possible.

The tank system consists of one or more gel fuel tanks which can be arranged spatially independent of the combustion chamber according to the requirements of the system.

As gel fuels cannot be drawn-in by pumps they have to be conveyed out of the tank and into the combustion chamber by pressure preferably; if appropriate, the tank pressurization can also provide the feed of gel fuel to a downstream pump.

Preferably the fuel is injected at the wall opposite to the outlet openings (front side), but can also be injected from bottom or the side or a different direction.

A mere pressure conveyance is no severe disadvantage compared to systems with liquid propellant because also liquids have to be conducted at least to the inlet of a pump by means of pressure application in case of strong accelerations of the missile. Furthermore for comparatively small systems like trajectory and position control systems also liquid fuels are directly conveyed by pressure from the tank into the combustion chamber omitting complex and sophisticated pumps. The ratio of tank pressure/combustion chamber pressure is approximately equal for gel fuel engines and liquid fuel engines, because it is primarily not determined by the flow resistance of the injector, but by the requirement that pressure variations in the combustion chamber should not propagate along the fuel conduits or pipes upstream which could enhance the variations of the combustion chamber pressure by synchronous fluctuations of the fuel supply.

Preferred tank designs are:
  tanks with piston conveyance, preferably for tanks with a large ratio of length/diameter;
  tanks with membrane conveyance, preferably for tanks with small ratio of length/diameter. Here several designs are possible:
  one or more membranes are fixed along the circumference of the tank and divide it in two chambers for fuel and pressure gas; the outflow or delivery of the gel fuel occurs at a side through the tank wall, preferably through one opening arranged in the dome vertex; a delivery at another site or even through the membrane, as well through several openings, is also possible in principle, if this should become necessary from the system's point of view;

additionally one or more membranes can be attached within the tank at a preferably central, but if applicable also modular, carrier structure and be pressurized from outside by the pressurized gas; the delivery of the gel fuel then occurs through the central carrier structure;

furthermore one or more membranes can be attached within the tanks at a preferably central, but if applicable also modular, carrier structure and be pressurized from inside by the pressurized gas; in this case the delivery of the gel fuel occurs through one or more outlets in the tank wall.

The selection of the tank design is more determined by the system requirements, e.g. shape of the thank and permitted shift of the centre of gravity, than by the nature of the fuel.

In particular gel mono-propellants are in general well compatible with metal materials. According to system requirements the gel fuel tanks can be made of metal alloys or a fibre composite material with suitable internal liner or suitable internal coating.

In case of using gas of solid gas generators for tank pressurization, if necessary, an internal thermal protection layer is added or the internal liner takes over this function.

The delivery or conveyance pistons serve for the physical separation of pressurization gas and gel fuel, whereas the force transmission is negligible; finally the pressure difference between gas side and gel fuel side of the piston approximately corresponds to the friction force at the gaskets divided by the piston's cross-section. Thus, the piston can be easily configured correspondingly if it is driven by means of pressurized gas.

Besides a drive by pressurized gas the pistons can also be moved mechanically, e.g. by means of a spindle or another mechanical device.

With a view to pistons to be used, generally, the piston contour is preferably equal to the tank bottom contour to minimize the residual quantities remaining in the tank.

A gasket, if necessary, between gas volume and gel fuel volume can be achieved by means of a labyrinth, wiper rings, lip seals, preferably lip seals in case of pressurization with hot gas from a solid fuel gas generator, and wiper rings in case of pressurization with "cold" pressurized gas.

The piston design with regard to material selection and shaping is preferred such that the piston follows the cross-section increase of the gel fuel tank during the pressurization.

In case of hot gas pressurization it is advantageous, if the piston is provided with a thermal insulation layer, for example thermal protection colour swelling when heated, filled and unfilled polymers, polymer foams, mineral foams or wool, preferably filled polymers, at gas side.

Electric, hydraulic and pneumatic drives or mixed forms are possible as drives, even though the direct application by pressurized gas is the preferred solution because those drives are more complex and more difficult to assemble compared to the drive by means of pressurized gas.

A membrane can also be used for a physical separation of gas and gel fuel. Also the membrane has a very small pressure difference between gas side and gel fuel side and can correspondingly easily be implemented as long as tightness is guaranteed.

As long as one or more membranes are used in the present invention membranes of metal, polymer material or composite material of both, if applicable reinforced by fibrous tissue, e.g. textile, carbon fibre, aramide fibre, other polymeric or mineral fibres are suited. Where appropriate on fuel side a coating can be used if the polymer material would not be compatible with the fuel; e.g. vapour deposition with metal, applying a metal film or the like.

The trajectory control and/or position control system according to the invention comprises a rocket engine or gas generator preferably having a tank pressurization system explained below.

The constructive design of the tank pressurization system per se is at will of those skilled in the art and complies with the following characteristics, functions and descriptions of the type of this device.

For the tank pressurization system the following technical solutions are possible:

A pressurization with inert gas from a pressurized gas tank is according to the invention. In a preferred design a pressure reducer exactly makes so much gas flow into the gel fuel tank that the tank pressure does not exceed the design pressure. A valve, e.g. a pyro-valve, opens the gas pipe at the start of operation. Till this time the gel fuel tank is pressureless. A configuration with a controlled valve is also possible. In a further configuration such a valve can also take on the closing function for the pressurized gas tank during the storage period.

Pressurization with gas generated by a solid fuel gas generator is according to the invention as well. This gas generator will be ignited at the start of operation. Till this time the gel fuel tank is unpressurized. However the gas of the gas generator is comparatively hot, even if the combustion temperature is significantly lower than that of the solid fuels of rockets. Therefore, the tank requires a heat protection. For this purpose a solid fuel gas generator is considerably more compact than an inert gas tank.

The gas temperature can also be reduced by special, temperature reducing measurements, e.g. a mixture of the hot gas with substances emitting gas when absorbing heat, or by hybrid gas generators, hence a combination of solid gas generator with inert gas tank.

The appropriate configuration of the solid fuel gas generator by selection of an appropriate propellant configuration, also by means of segments of different burning rate and different burning surfaces, also allows within some limits to cover various possible gel fuel delivery profiles, depending on usage, by means of a solid fuel gas generator with a propellant. This method has also been proved experimentally.

Another solution is the use of a set of several solid fuel gas generators which are fired as needed, when the gas pressure in the fuel tank falls blow a fixed threshold value. This threshold value can also be set and adjusted during the use according to the mission. As the gel fuel mass flow is regulated by the flow valve unit between tank and injector and/or by the opening or closing and opening of variable injector elements, the tank pressure has not to be regulated within a narrow range, but fluctuations are permitted. An essential criterion is the fact, that the tank pressure must always be higher than the combustion chamber pressure by a given factor.

Which tank pressurization variant is most appropriate depends on system parameters like available volume, operating period and allowed mass.

The above-mentioned characteristics of the gel fuel propulsion system and its gas generator related components permit a wide adjustment of the design to the requirements of the total system, hence insofar this shall be configured for satellites, spacecrafts, missiles and aircrafts and the therefore required components of the combustion chamber, the nozzle systems, the tank and the pressurization system in general, but in particular for the ACS/DACS systems, according to system requirements.

An embodiment of the invention will be described below. Thereby

Figure 2:
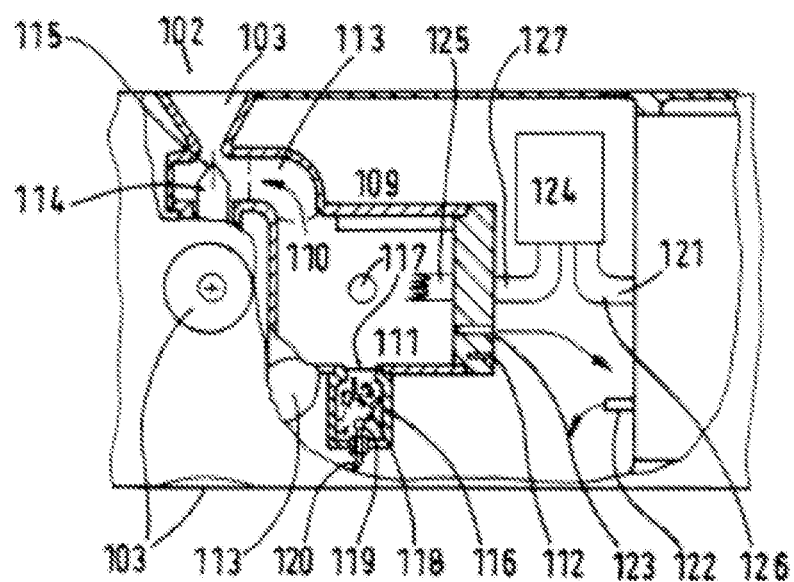
Figure 3:
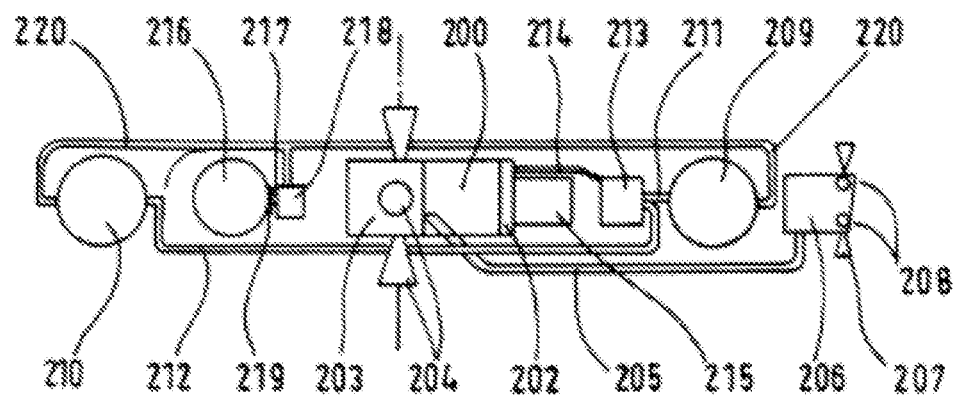
Figure 4:
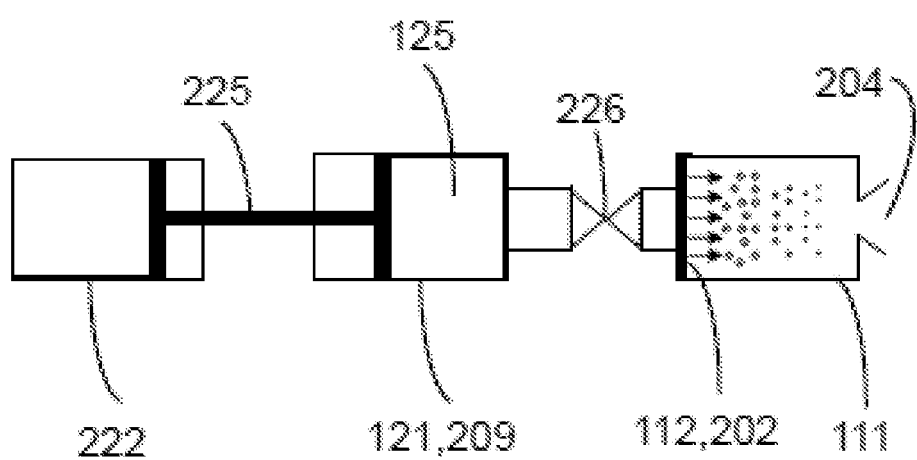
Figure 5:
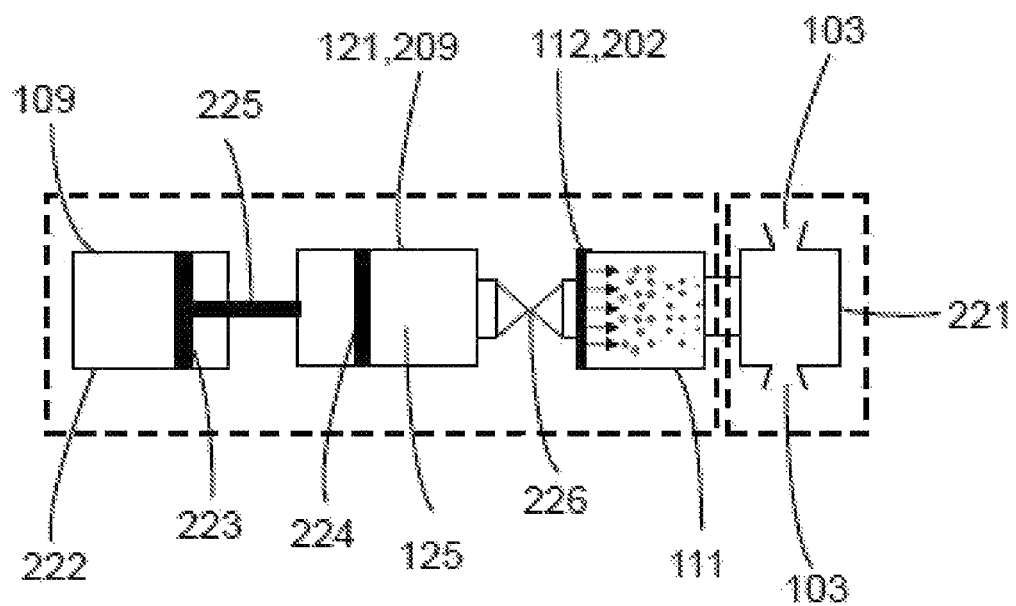

FIG. 1 shows the schematic sketch for a trajectory control of an endo-atmospheric missile, FIG. 2 shows the detailed representation of the gas generator components according to the invention of FIG. 1, FIG. 3 shows the schematic sketch for a trajectory control of an exo-atmospheric kill vehicle, FIG. 4 shows a schematic sketch of the apparatus according to the invention with a control of the gel mass flow and the combustion chamber pressure with an trajectory control nozzle, FIG. 5 shows a schematic sketch analog to FIG. 4 with the difference that a plenum with two transverse thrust nozzles is depicted.

These examples explain the way how such a device can be designed for a trajectory control and/or position control corresponding to given requirements as well as constraints and initial conditions:

FIG. 4 and FIG. 5 show a configuration of the apparatus according to the invention with the essential components of the propulsion with all possibilities for controlling the gel mass flow and thereby the thrust. The components consist of a conveyance system 222 in the configuration of a gas generator 109. As shown, in this context the term gas generator is to be understood pars per toto for the conveyance system 222 which can also comprise a pressurization tank.

Furthermore the component of the tank can be seen in the configuration of the gel tank 121, 209. In the depicted embodiment the tank has a cylindrical shape with an internal piston system 224. The piston 224 is set under pressure by gas by means of a corresponding piston 223 and conveys the gel into the combustion chamber 111. This occurs through a regulator valve 226 or a corresponding regulator valve system. The regulator valve serves for controlling the mass flow.

More than one tank can be provided. The injector head 112, 202 can be seen subsequent to the regulator valve 226. Arrows and bubbles in the combustion chamber 111 indicate that the gel fuel is injected into the combustion chamber 111 in this configuration.

Following the combustion chamber the trajectory control nozzle or rather thrust nozzle 204 can be seen, FIG. 4. On the other hand, FIG. 5 shows a special configuration of a transverse thrust nozzle system representing the plenum 221 with only two transverse thrust nozzles 103 as an example.

FIG. 1 shows the schematic sketch for a trajectory control of an endo-atmospheric missile 99. In the application described here the device 100 according to the invention serves for the fast generation of an angle of attack of the missile 99 flying within the atmosphere. The aerodynamic stabilization and control 101, 102 is effective in principle, but not effective enough to provide the agility required for a direct hit.

If immediately after the take-off a quick direction change of the missile towards a collision point should be necessary, the trajectory control device can also be used therefore.

In FIG. 2 a configuration with a one-time re-ignition is shown. This enables to leave the trajectory control device inactive between the phases "initial direction change" and "target approach" and to save the otherwise necessary, although small, reactive-energy or idle consumption of fuel during this phase.

As FIG. 1 shows, four transverse thrust nozzles 103 in cartesian arrangement are used. These are arranged ahead of the centre of gravity 104. The thrust 106 of the active nozzle generates an angle of attack 105 to the incident flow 107. Additionally, the thrust enhances the aerodynamic transverse force 108.

The four nozzles 103 are supplied with gas 110 by a central gel gas generator 109. The gas generator 109 comprises a combustion chamber 111 with injector head 112 and gas pipes 113.

The variation of the nozzle throat cross-section of a nozzle 103 occurs by shifting a conical mandrel 114 extending and retracting in the nozzle throat 115 (the actuator of the mandrel is not shown). One of the two igniters 116 is shown in cross-section, whereas the other is located on the opposite side of the combustion chamber behind the separation bulkhead 117. This insulates the igniter 116 and protects the second igniter against ignition by the gases produced in the gel gas generator during the first operating phase. In the igniter there is a igniting charge 118. Here, a filling of powder particles is shown; but propellants in different configuration and design (monolithic, tablets, rods etc.) are also possible.

The propellant charge of the igniter 118 is ignited by an ignition pill 119 which is initiated through the electric line 120. When the ignition propellant burns, the gas pressure destroys the membrane and the gas generated by the igniter 116 flows into the combustion chamber 111.

The initial process starts with the pressurization of the gel fuel tank 121. When the pressure transducer 122 registers that a given threshold value is exceeded, the ignition can be enabled (here not depicted in the figure). The function of the gas generator is initiated by the ignition of the first igniter 116.

As described above, the gas produced by the propellant 118 flows into the combustion chamber 111. When the pressure transducer 123 registers that a specified threshold value is exceeded, the gel fuel supply is started. The valve 124 opens and the gel fuel 125 flows from the tank 121 through the gel fuel conduits 126 and 127 into the injector head 112 and is injected into the combustion chamber. During the starting procedure the conical mandrels 114 are set to a position which on the one hand guarantees a sufficient insulation and on the other hand does not cause any pressure peaks during the starting procedure.

The gas being formed in the combustion chamber 111 flows through the nozzles 103 to the atmosphere and generates a repulsive force. The resultant of all four repulsive forces then is the desired lateral force.

The regulation of the gel fuel flow can be performed by means of the valve 124 as along as the flow conditions in the injector enable a combustion. The control of the mandrels 114 independent from each other enables the adjustment of the common outlet cross-sections such that the combustion chamber pressure is in a range appropriate for the quality of the combustion and nozzle flow.

If the gel fuel mass flow becomes so small that the injectors do no longer operate correctly, closable injector elements have to be used. If the gel fuel gas generator should be switched off in the meantime all injector elements are advantageously implemented as injector elements which can be switched off.

FIG. 3 shows the schematic sketch for a trajectory control of an exo-atmospheric kill vehicle.

In this application stronger thrust nozzles orientated through the centre of gravity cause the trajectory change and peripheral smaller thrust nozzles cause the position change or stabilization. FIG. 3 illustrates the arrangement of some essential components for such a collision apparatus.

Here a central gas generator 200 is constructed in principle like the central gas generator 109 in FIG. 2.

The same applies for the injector head 202 (112) with the control for the variable injectors 215 and the valve actuating system 203 with trajectory control nozzles 204.

Furthermore, gas is piped from the central gas generator 200 through the pipe 205 to the actuating system 206 for the position control nozzles 207 and 208. Two nozzles 208 enabling a roll control or stabilization are respectively oriented normal to the drawing plane.

The fuel tanks 209 and 210 are arranged symmetrically to the centre of gravity and oriented such that the delivery or rather outflow of the gel fuel also occurs symmetrically. Here the advantage of a gel-like fuel that widely behaves like a solid fuel and does not slosh around so that the position of the centre of gravity is not influenced hereby, but remains stable, comes into effect. The gel fuel is passed through the pipes 211 and 212 to the flow control device 213. From this device the gel fuel is passed through the pipe 214 to the injector head 202.

The pressurized gas for the fuel conveyance is carried along in the gas tank 216. For symmetry reasons it can be possible to use two gas tanks arranged symmetrically to the centre of gravity, if the required gas mass is large or a heavy gas like nitrogen or argon is used. However, helium is preferably used; for shorter storage period hydrogen is also recommendable. The pressurization gas flows through the closing valve 219 and the pipe 217 to the pressure reducer 218. The gas pipe 220 then guides the pressurization gas to the fuel tanks 209 and 210.

For all the components shown in FIGS. 1, 2 and 3 the above-described variants can be used, if this is advantageous for the respective application.

As well others of the above-described components can be added to the components shown in FIGS. 1, 2 and 3. For example, the tanks 209 and 210 can also contain fuel and oxidizer of a two-component system. Then the ratio of the distances of the respective tanks from the centre of gravity of the kill vehicle has to be selected reciprocally corresponding to the mass ratio of fuel and oxidizer.

A further variant provides separate gas generators of different performance for the trajectory control and position control engines. This increases the complexity of the device, but is a solution when no gas directing pipe 205 can be used. It is a disadvantage that the idle gas flow has to be symmetrically discharged unused in a non re-ignitable gas generator 200, whereas it is at least partially used for the position control in the variant shown in FIG. 3. With a re-ignitable gas generator 200 this idle consumption does not exist at the expense of a higher complexity of the device.

In a further variant the position control nozzles are operated with inert gas from the pressurized gas tank 217 of the already present pressurized gas supply for the gel fuel conveyance. This reduces the complexity of the device and is useful when the total impulse required for the position control is relatively small; especially if pressurized gas with smaller mol mass and therefore relative good mass-specific impulse is used.

REFERENCE NUMERALS 99 missile
100 angle of attack device
101 aerodynamic control surface
102 aerodynamic control surface
103 transverse thrust nozzle
104 centre of gravity
105 angle of attack
106 thrust
107 incident flow
108 aerodynamic transverse force
109 gas generator
110 gas
111 combustion chamber
112 injector head
113 gas directing pipe
114 conical mandrel
115 nozzle throat
116 igniter
117 separation bulkhead
118 ignition charge/propellant
119 ignition pill
120 electric line
121 gel fuel tank
122 pressure transducer
123 pressure transducer
124 valve
125 gel fuel
126 gel fuel pipe
127 gel fuel pipe
200 gas generator
202 injector head
203 valve actuating system
204 trajectory control nozzle
205 conduit or pipe
206 actuating system
207 position control nozzle
208 position control nozzle
209 fuel tank
210 fuel tank
211 pipe
212 pipe
213 flow control device
214 pipe
215 injector
216 gas tank
217 pipe
218 pressure reducer
219 closing valve
220 gas pipe
221 plenum
222 conveyance system
223 piston
224 piston
225 pipe
226 valve

The invention claimed is:

1. Apparatus for trajectory control and/or position control of a missile, comprising a controllable gas generator with a fuel flow control valve, an injector head with one or more injector elements, a combustion chamber generating combustion gases and at least one outflow nozzle, which has one of a variable nozzle throat cross-section, which is adjustable, and at least one throttle to vary discharge of said combustion gases from said outflow nozzle and vary nozzle thrust generated thereby.

2. Apparatus according to claim 1, characterized in that the apparatus is operated with gel fuel combusted in said combustion chamber.

3. Apparatus according to claim 1, characterized in that the apparatus comprises a tank arrangement which is arranged separate from the combustion chamber.

4. Apparatus according to claim 3, characterized in that said apparatus comprises a device for a tank pressurization.

5. Apparatus according to claim 1, characterized in that said injector elements of the injector head comprise variable injectors.

6. Apparatus according to claim 1, characterized in that said one or more injector elements of the injector head has injectors which are switchable on and off.

7. Apparatus according to claim 1, characterized in that the injector elements of the injector head are configured as a baffle injector.

8. Apparatus according to claim 1, characterized in that said variable throat cross-section of the at least one outflow nozzle is stepwise adjustable.

9. Apparatus according to claim 1, characterized in that the combustion chamber is designed as a metal combustion chamber of at least one alloy with high melting point.

10. Apparatus according to claim 1, characterized in that the combustion chamber is designed as a ceramic combustion chamber.

11. Apparatus according to claim 10, characterized in that the ceramic combustion chamber is configured without an internal heat shield of fiber-composite ceramic material.

12. Apparatus according to claim 1, characterized in that the combustion chamber has a heat shield of a ceramic or ablating material.

13. Apparatus according to claim 1, characterized in that a smallest cross-section of the variable nozzle throat cross-section is adjustable from maximally open to at least one of minimally open and completely closed.

14. Apparatus according to claim 1, characterized in that the throttle has a variable cross-section for controlling said combustion gas supplied to said outflow nozzle.

15. Apparatus according to claim 1, characterized in that the throttle has a stepwise adjustable cross-section for controlling said combustion gas supplied to said outflow nozzle.

16. Apparatus according to claim 1, characterized in that said apparatus comprises a device for controlling and regulating fuel mass flow to said combustion chamber, and a combustion chamber pressure during combustion of said fuel mass flow and controlling said one of said variable nozzle throat cross-section and said at least one throttle.

17. System for trajectory control and/or position control of a missile, comprising an apparatus with a controllable gas generator and a fuel flow control valve with an injector head having one or more injector elements, and a combustion chamber generating combustion gases and at least one outflow nozzle, which has one of a variable nozzle throat cross-section, which is adjustable, and at least one throttle to vary discharge of said combustion gases from said outflow nozzle and vary nozzle thrust generated thereby, as well as a tank arrangement arranged separate from the combustion chamber and a gel fuel as propellant medium.

18. System according to claim 17, characterized in that the apparatus is designed in a modular and/or scalable manner.

19. System according to claim 18, characterized in that the gas generator is configured with a device capable of switching off and re-igniting said gas generator for pressurizing devices or for driving actuators, turbines, engines or other working machines.

20. System according to claim 17 characterized in that the apparatus or its parts can be arranged freely according to the respective system requirements of an Attitude Control System and/or Divert and Attitude Control System.

21. System according to claim 17, characterized in that the apparatus and the gel fuel are provided with a device configured for switching off and re-igniting the gas generator during operation.

22. System according to claim 21, characterized in that the system has an additional transverse thrust system and a thrust vector control.

23. Apparatus for trajectory control and/or position control of a missile, comprising a controllable gas generator, which comprises:
 a fuel flow control valve controlling a fuel flow of gel fuel;
 an injector head with one or more injector elements which receive said fuel flow from said fuel flow control valve;
 a combustion chamber operatively connected to said injector head to combust said gel fuel in said combustion chamber wherein said one or more injector elements inject said fuel flow of said gel fuel into said combustion chamber with sufficient fuel flow to maintain combustion and form pressurized combustion gases; and
 at least one outflow nozzle, which receives said combustion gases from said combustion chamber and discharges said combustion gases from said outflow nozzle to an exterior of said missile to generate lateral thrust oriented laterally relative to a longitudinal axis of said missile, said outflow nozzle including one of a variable nozzle throat cross-section, which is adjustable to vary the variable nozzle throat cross-section, and at least one throttle to vary said discharge of said combustion gases and said lateral thrust generated therefrom.

24. Apparatus according to claim 23, wherein said combustion chamber includes an igniter device for igniting said combustion of said gel fuel within said combustion chamber and a control device for controlling and regulating fuel mass flow through said injector elements, a combustion chamber pressure during said combustion, and a nozzle outlet cross-section to vary said discharge of said combustion gases.

* * * * *